8910X
J. G. Hotchkiss,
Latch.
Patented June 19, 1835.
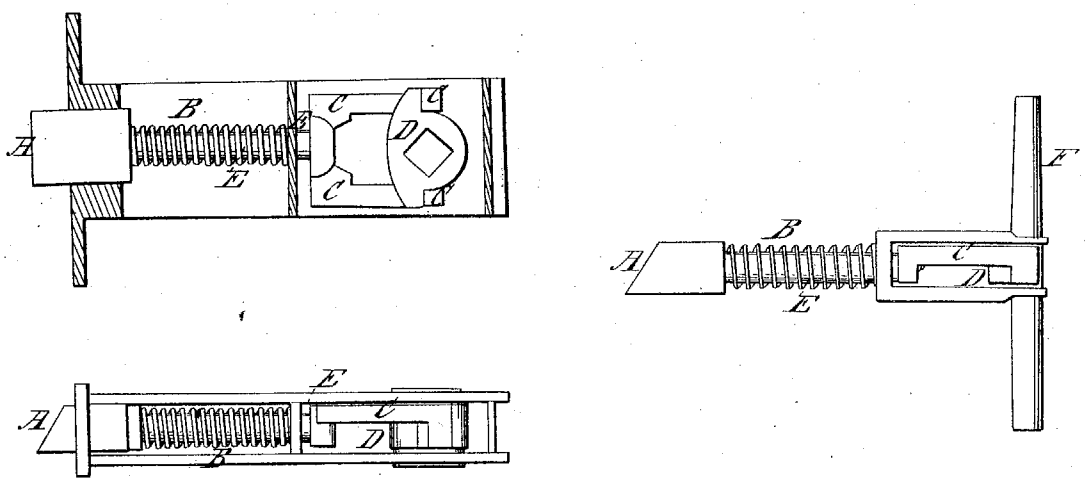
AM. PHOTO-LITHO. CO. N.Y. (OSBORNE'S PROCESS.)

John G. Hotchkiss.
Letters Patent. (Dated June 19. 1835.)

The Schedule refered to in these Letters Patent and making part of
the same, containing a description in the words of the said John G. Hotch-
kiss himself of his improvement in the Mortice Lock & Latch for chamber doors
called "Hotchkiss's Mortice Lock & Latch."

---

Be it known that I, John G. Hotchkiss of New Haven, County of New
Haven, and State of Connecticut, have made an improvement on the mortice
lock & latch for chamber doors – called Hotchkiss's Mortice Lock & Latch" which are
described as follows. This lock consists of the bolt, spiral spring, & the case
in which the tumbler acts: the tumbler which acts on the shank of the bolt, and
to which is attached the spiral spring, the spiral spring, wound round, and
fastened or slipped on to one end of the bolt, and the bolt & guard of the lock
all these parts of the lock are similar to those now in use, except the tumbler
& the case in which it acts & wherein my improvements for which I claim a
patent rest. The case is made of brass or any other suitable metal, it is attached
to the shank of the bolt round which the spiral spring is wound, and has
an opening in it to receive the spindle and to allow it to play freely, it has
also a shoulder against which the tumbler acts to carry the shaft of the bolt
back as well as to compress the spiral spring. The Tumbler is made the segment
of a circle having a square opening in a projecting piece to receive the spindle.
This tumbler when turned by the knob & spindle carries back the case with the
shank attached to it & compresses the spiral spring. A guard or tumbler to the
lock secured to the plate, serves as a rest to support the spiral spring with
the bolt, & through which the shank passes. This guard is also used as a
tumbler to the bolt of the lock. This invention may be used in the latch
singly, by making the tumbler upon the spindle & forming a step or tumbler
channel, through the end of which the shank of the bolt passes & upon
which the spring rests, the case at the end of the bolt works within the step
or tumbler channel & the end of the step fits the circumference of the spindle
of tumbler. Operation. The spindle which is attached to its knobs or handles

8910X is inserted into the square opening in the tumbler, and being turned
partly round contracts the spiral spring by forcing the case backwards
of the striker & admitting the door to be opened & the latch can be used alone without the lock
by the tumbler, thus forcing the head of the latch bolt out, by inserting a
slip through which the shank of the bolt of the latch passes & upon which the
spring rests. The invention here claimed & desired to be secured by Letters
Patent consists in the case & tumbler as before described, with the arrange-
ment and adaptation of the several parts of the same. For a further illustra-
tion of my invention I refer to the models & drawings of the same deposited
in the Patent Office.

Witnesses.
L. C. Lee.
Clement F. Coote,

John G. Hotchkiss.

Expd
W.G.C.

[illegible]

(585 words)